US009582782B2

(12) United States Patent
Bhide et al.

(10) Patent No.: US 9,582,782 B2
(45) Date of Patent: Feb. 28, 2017

(54) DISCOVERING A REPORTING MODEL FROM AN EXISTING REPORTING ENVIRONMENT (75) Inventors: Manish A. Bhide, Hyderabad (IN); Ajay K. Gupta, New Delhi (IN); Mukesh K. Mohania, Agra (IN); Sumit Negi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 13/438,903

(22) Filed: Apr. 4, 2012

(65) Prior Publication Data
US 2013/0265326 A1 Oct. 10, 2013

(51) Int. Cl.
*G06T 1/00* (2006.01)
*G06Q 10/06* (2012.01)

(52) U.S. Cl.
CPC .............................. *G06Q 10/0639* (2013.01)

(58) Field of Classification Search
CPC .... G06F 3/0486; G06F 17/30554; G06F 8/34; G06F 17/30398; G06F 17/30973; G06F 17/30997; G06F 9/543; G06F 9/503; G06T 11/206
USPC ........................................................ 345/440
IPC ............................................ G06F 9/543,9/5033
See application file for complete search history.

(56) References Cited

U.S. PATENT DOCUMENTS

| 6,993,533 | B1 * | 1/2006 | Barnes .......................... 707/102 |
| 7,325,003 | B2 | 1/2008 | Blackwell et al. |
| 7,636,709 | B1 | 12/2009 | Srikant et al. |
| 7,747,651 | B2 | 6/2010 | Potter et al. |
| 7,941,438 | B2 * | 5/2011 | Molina-Moreno ....... G06F 8/35 707/756 |
| 7,949,500 | B2 | 5/2011 | Riggle |
| 2003/0135827 | A1 | 7/2003 | Kanzler et al. |
| 2004/0093559 | A1 * | 5/2004 | Amaru et al. ................. 715/502 |
| 2005/0071737 | A1 * | 3/2005 | Adendorff .............. G06Q 10/00 715/276 |
| 2005/0143969 | A1 | 6/2005 | DeMesa et al. |
| 2005/0262047 | A1 * | 11/2005 | Wu ................... G06F 17/30719 |
| 2012/0179713 | A1 * | 7/2012 | Stolte et al. ................... 707/769 |

FOREIGN PATENT DOCUMENTS

EP 1394696 A2 3/2004

OTHER PUBLICATIONS

Lanin, "Architecture and Implementation of Reporting Means in Adaptive Dynamically Extended Information Systems" International Journal "Information Technologies and Knowledge" vol. 2 / 2008, pp. 273-277 [online], [retrieved on Nov. 10, 2011]. Retrieved from the Internet <URL: http://www.foibg.com/ijitk/ijitk-vol02/ijitk02-3-p12.pdf>.

(Continued)

*Primary Examiner* — Ke Xiao
*Assistant Examiner* — Kim-Thanh T Tran
(74) *Attorney, Agent, or Firm* — Lance I. Hochhauser; Jason H. Sosa (57) ABSTRACT

Computer software is disclosed for discovering and representing a reporting model of an existing reporting environment. For each report in a plurality of reports, the software searches metadata of the report for descriptive information and dependencies on other reports. The software depicts, in a graphical representation, each report and relationships between the reports.

20 Claims, 7 Drawing Sheets (56) References Cited

OTHER PUBLICATIONS

Olszak et al., "Approach to Building and Implementing Business Intelligence Systems" Interdisciplinary Journal of Information, Knowledge, and Management vol. 2, 2007, pp. 135-148 [online], [retrieved on Nov. 9, 2011]. Retrieved from the Internet <URL: http://ijikm.org/Volume2/IJIKMv2p135-1480Iszak184.pdf>.

Srinivasan et al., "Multi-agent Based Decision Support System Using Data Mining and Case Based Reasoning" IJCSI International Journal of Computer Science Issues, vol. 8, Issue 4, No. 2, Jul. 2011, pp. 340-349 [online], [retrieved on Nov. 8, 2011]. Retrieved from the Internet <URL: http://www.ijcsi.org/papers/IJCSI-8-4-2-340-349.pdf>.

* cited by examiner

DISCOVERING A REPORTING MODEL FROM AN EXISTING REPORTING ENVIRONMENT

FIELD OF THE INVENTION

The present invention relates generally to the field of business intelligence and more particularly to discovering and representing an underlying reporting model in a business intelligence reporting environment.

BACKGROUND OF THE INVENTION

Business intelligence (BI) refers to computer-based techniques used in identifying, extracting, and analyzing business data (e.g., associated costs and incomes, sales revenue by products, etc.). Common functions of business intelligence technologies are reporting, analytics, data mining, process mining, complex event processing, business performance management, benchmarking, and text mining. To organize and present the business data in a human readable form (often by querying a plurality of data sources and compiling results), reports are created and run and can number into the hundreds or even thousands. This group of reports may be referred to as the reporting environment of an organization. The way in which these reports relate to and interconnect with one another may be referred to as the reporting model of the reporting environment. A plethora of reporting tools and software exist for creating and managing such reports.

SUMMARY

One embodiment of the present invention discloses a method, computer program product, and system for representing a plurality of related reports (i.e., the reporting model of a reporting environment). In a computer-implemented process, it is determined, by operation of one or more computer processors, that metadata associated with a first report in a plurality of related reports contains a reference to a second report in the plurality of related reports. The process then creates, by operation of the one or more computer processors, a graphical representation for display on a display device, the graphical representation depicting each of the plurality of related reports, including the first and second reports, and, based on the determined reference, a relationship between the first and second reports.

Another embodiment of the present invention further discloses the process identifying, by operation of the one or more computer processors, one or more descriptive elements in the metadata associated with the first report, and annotating the depiction of the first report in the graphical representation with the one or more descriptive elements.

In a third embodiment of the present invention, the created graphical representation further depicts all the relationships between every respective report of the plurality of reports.

DETAILED DESCRIPTION

Figure 1:
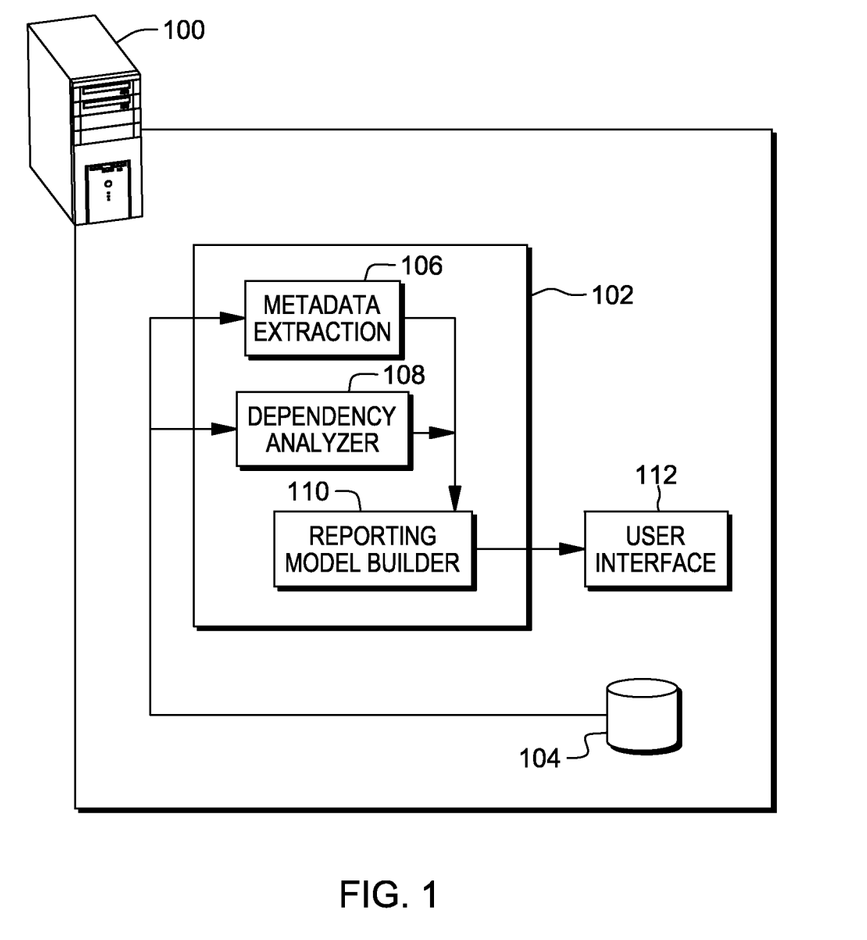
FIG. 1 is a block diagram of a data processing system according to an embodiment of the present invention.

The present invention will now be described in detail with reference to the Figures. FIG. 1 illustrates a data processing system, generally designated 100, according to one embodiment of the present invention.

Data processing system 100 may be a server computer, a client computer, a notebook computer, a laptop computer, a tablet computer, a handheld device or smart-phone, a thin client, or any other electronic device or computing system capable of receiving input from a user, performing computational operations, and displaying data. In another embodiment, data processing system 100 represents a computing system utilizing clustered computers and components to act as a single pool of seamless resources when accessed through a network. This is a common implementation for datacenters and for cloud computing applications.

Embodiments of the present invention recognize that, in businesses and systems where large quantities of reports are executed, those unfamiliar with the existing reporting environment may invest a significant portion of time and effort to understand the reporting environment. In a preferred embodiment, data processing system 100 contains reporting model discovery program 102 for discovering and representing an underlying reporting model of a reporting environment. Reporting model discovery program 102 receives a report from a database or repository 104 (hereinafter "reporting repository 104"), extracts metadata that serves as the basis for building the report, extracts dependencies and/or interconnections of the report with other reports, and ultimately builds and displays a reporting model based on the extracted information. Towards that end, reporting model discovery program 102 executes three functions: metadata extraction program 106, dependency analyzer 108, and reporting model builder 110 (hereinafter "model builder 110"). Metadata extraction program 106 and dependency analyzer 108 each respectively analyze a report. Metadata extraction program 106 extracts descriptive information (or elements) such as attributes, filters, and other content, and dependency analyzer 108 extracts dependencies and possible dependencies from the report to other reports. In another embodiment, a single function might extract both descriptive information and dependencies.

Any retrieved information is passed to model builder 110, which in turn creates a depiction of the report, preferably as a node providing at least some descriptive information of the report. Model builder 110 subsequently creates logical connections of the node to other nodes representing other reports from the reporting environment, and depicts the logical connections visually. Model builder 110 may visually depict this "web" of interconnected nodes via user interface 112. In the preferred embodiment, every report in the reporting environment is analyzed and added to the web of interconnected nodes. The interconnected reports represent the reporting model of the current reporting environment. A visual depiction of the reporting model may extend beyond the bounds of a display window of user interface 112. In the preferred embodiment, a user may cause the display window to traverse the visual depiction by traversing the logical connections from one report to another, by searching for specific report attributes, or by instructing the display to scroll up, down, left, or right.

Data processing system 100 can include internal and external components (depicted in FIG. 6) as described in more detail below.

Figure 2:
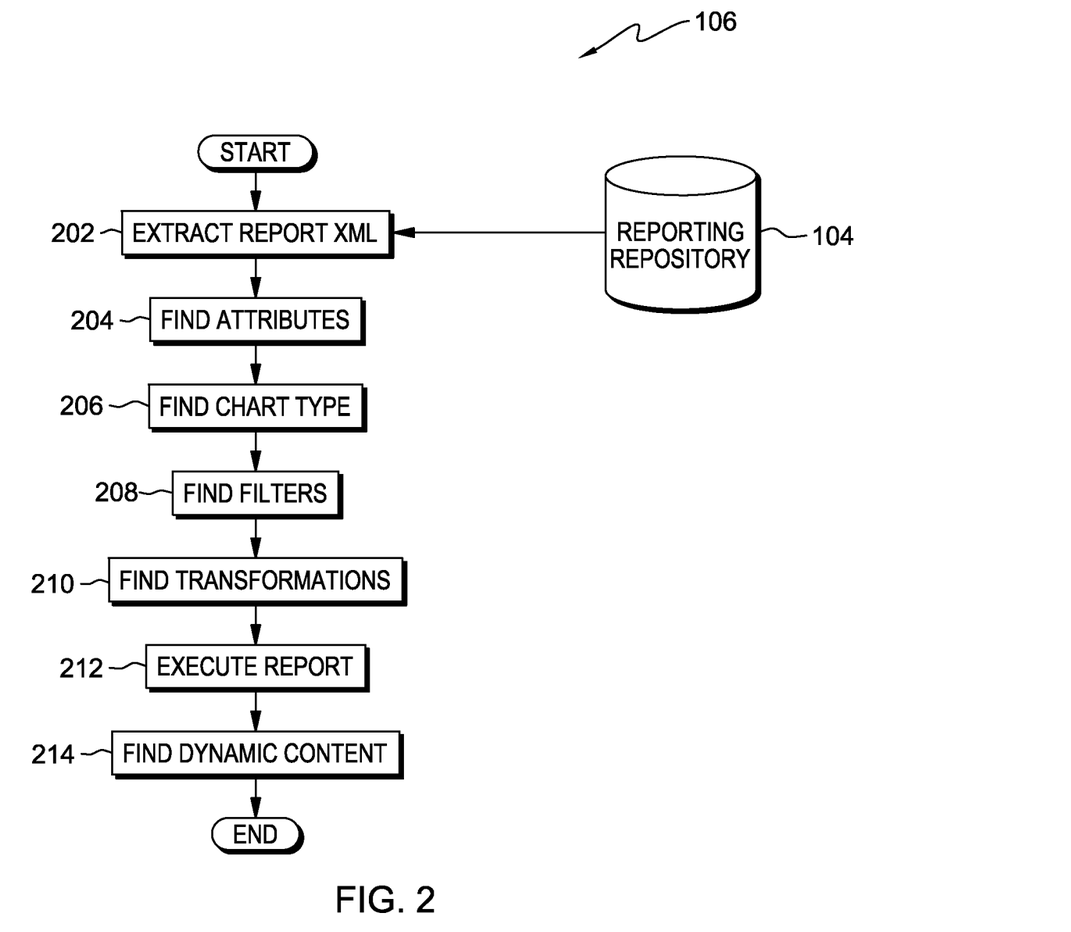
FIG. 2 is a flowchart depicting operations of a metadata extraction program for extracting, from a report, metadata describing the report.

FIG. 2 is a flowchart depicting operations of metadata extraction program 106 for extracting, from a report, metadata describing the report.

Metadata extraction program 106 receives a report from reporting repository 104 and extracts report metadata (202). The metadata is typically XML or other mark-up language organizing and describing the report. The metadata may then be searched to find attributes (204), chart types (206), filters (208), and transformations (210).

Typically, programs for creating reports each have their own standard vocabulary for describing and indicating different report elements. Different key words and formats would indicate standard attributes of a report, chart types, filters, transformation formulas, etc. In a preferred embodiment, metadata extraction program 106 would have a list of such vocabulary for multiple reporting programs. In some embodiments, such vocabulary may be added by a user of metadata extraction program 106 prior to searching the metadata of the report. Attributes of a report may include any characteristic of the report or element being described by the report (e.g., items in the report, types of items, geography, weights, etc.). Chart types might include pie charts, bar graphs, etc. In some embodiments chart types may be considered an attribute. Filters are functions applied to a set of attributes, which result in a more narrowly defined subset of the attributes. For example, a group of geographical attributes might include stores in South America. A (geographical) filter applied to the group of attributes might produce a subset of stores in South America, such as stores in Brazil. Transformations in a report are formulas that take as an input one or more attributes and produce or convert the input to another attribute. For example, a weight in kilograms might be converted to a weight in pounds.

Subsequent to searching the metadata for the aforementioned descriptive elements, metadata extraction program 106 executes or runs the report (212) and finds the dynamic content from the executed report (214). A report described by metadata may be executed at various times and the data gathered and manipulated for display may vary depending on a current state of the business. Prior to 212 and 214, metadata extraction program 106 had gathered a descriptive framework for the report; however, the results depicting the current state of the business have not been gathered. For example, metadata extraction program 106 may have gathered enough information to determine that the report portrays the top five states with the highest sales in the most recent quarter. However, until the report is executed, metadata extraction program 106 does not know which states are the top five.

Figure 3:
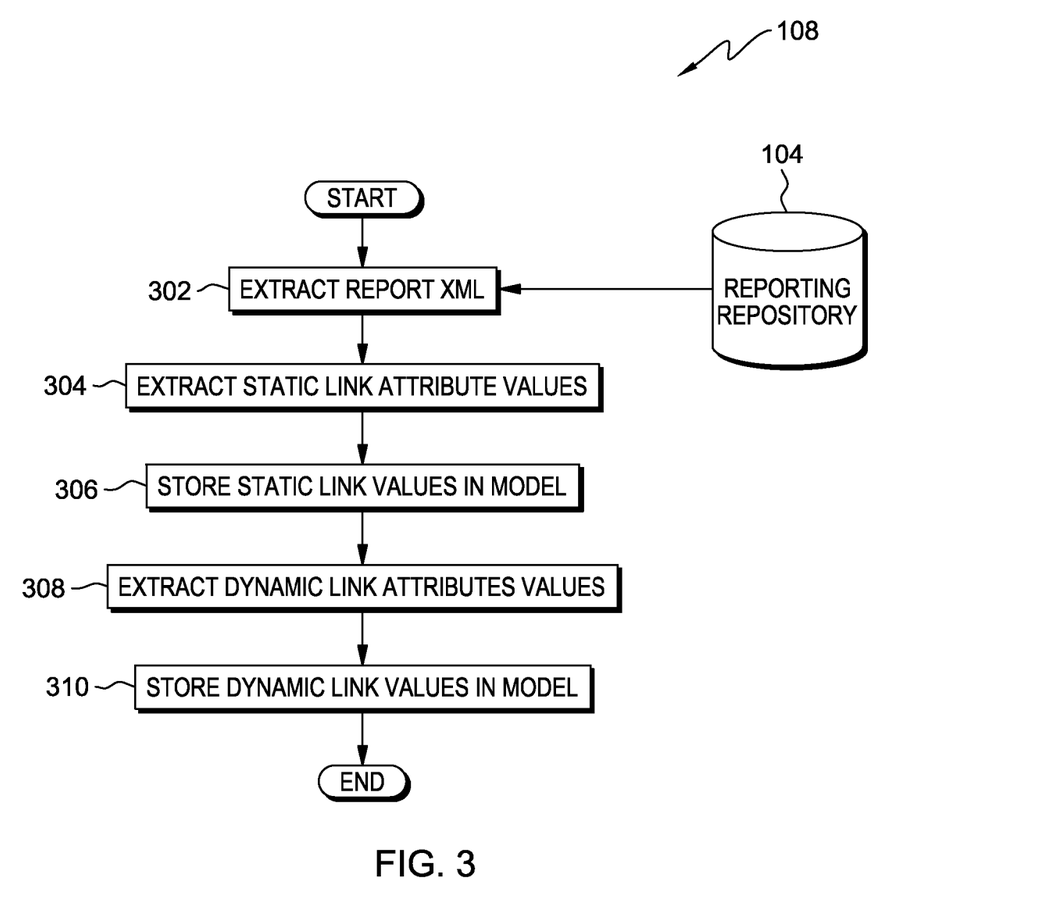
FIG. 3 is a flowchart depicting operations of a dependency analyzer program for determining interconnections between a report and one or more other reports.

FIG. 3 depicts operations of dependency analyzer 108 for determining interconnections between the report and one or more other reports. Dependency analyzer 108 may receive a copy of the report from reporting repository 104. In another embodiment, the functionality of dependency analyzer 108 may be interspersed with the functionality of metadata extraction program 106.

Similar to metadata extraction program 106, dependency analyzer 108 extracts the report metadata (typically XML) (302). Dependency analyzer 108 subsequently searches the metadata to determine and extract static links to attribute values (names) from another report (304). A static link can be thought of as a location or address of another report from which an attribute name is to be obtained, making the current report being analyzed, dependent on the other report. Any found static links are stored for subsequent use (306).

Dependency analyzer 108 also extracts and stores dynamic link attribute values (308 and 310, respectively). A dynamic link is a single connection to another report that can change or be selected from a group of possible connections. For example, in a report on country level statistics, the report may be further broken down, in response to a user selection, into one of four regions the country is divided into. Each "region" selection may link to a report on the selected region. Each of these four possible connections would be stored as a dynamic link.

Figure 4:
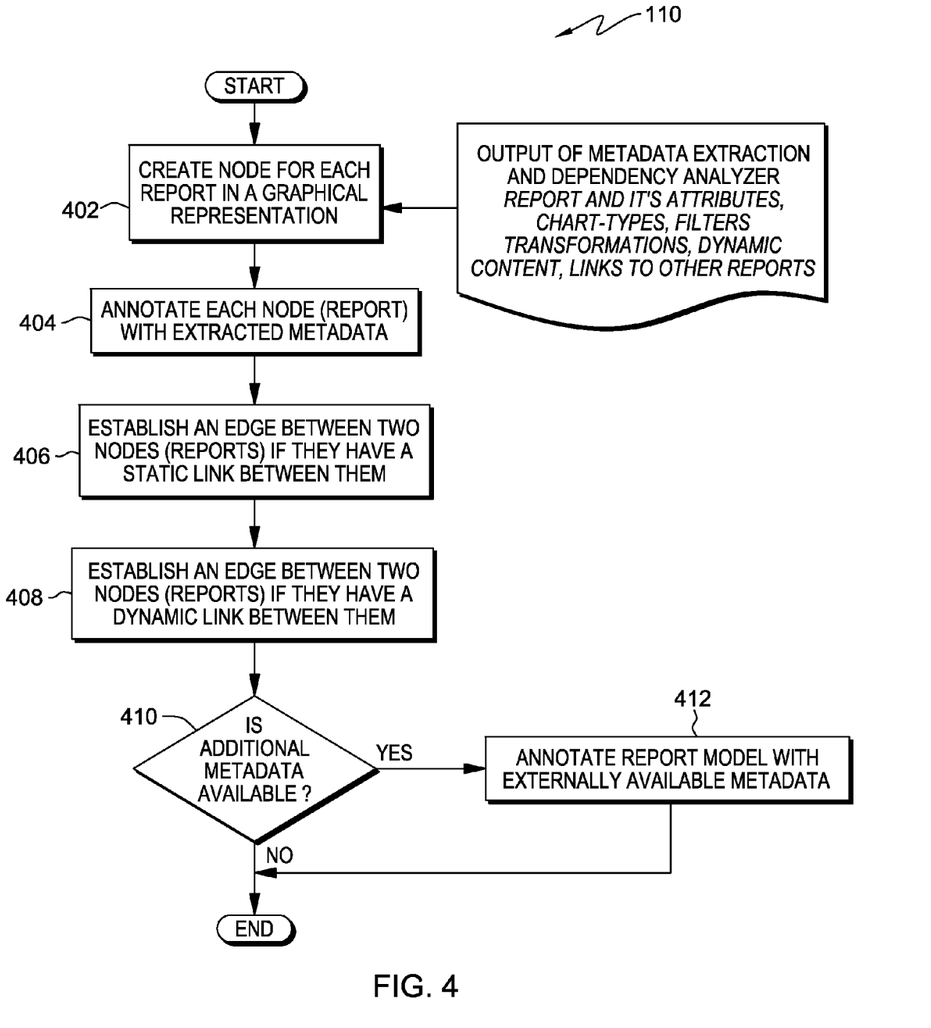
FIG. 4 is a flowchart depicting operations for building a reporting model of the reporting environment.

FIG. 4 depicts operations of model builder 110 for building a reporting model of the reporting environment. In the preferred embodiment, for each report in the reporting environment, the results of metadata extraction program 106 and dependency analyzer 108 are passed to model builder 110.

In one embodiment, model builder 110 creates a node for each report in a graphical representation (402) for subsequent display. In a preferred embodiment, each node is annotated with a title of the corresponding report. Model builder 110 further annotates each node with extracted metadata from the corresponding report (404), thereby displaying, in a single view, attributes and other descriptive elements of a specified report. Model builder 110 establishes an edge or line between nodes that have a static link between them (406) as determined by dependency analyzer 108. Similarly, model builder 110 establishes an edge or line between nodes that have a dynamic link between them (408). In one embodiment, dynamic links are depicted differently than static links.

In a preferred embodiment, model builder 110 determines whether there is additional metadata, external to the reports, available (410), and if there is, annotates the reporting model and/or nodes with the externally available metadata (412). For example, if there are documents associated with the reporting environment from which it can be determined the business units that execute each of the reports or a list of business units or persons who have access to each of the reports, this information may be added to the reporting model.

The resulting reporting model representation may appear as an interconnected "web" of nodes, each node representing a report in the reporting environment.

Figure 5:
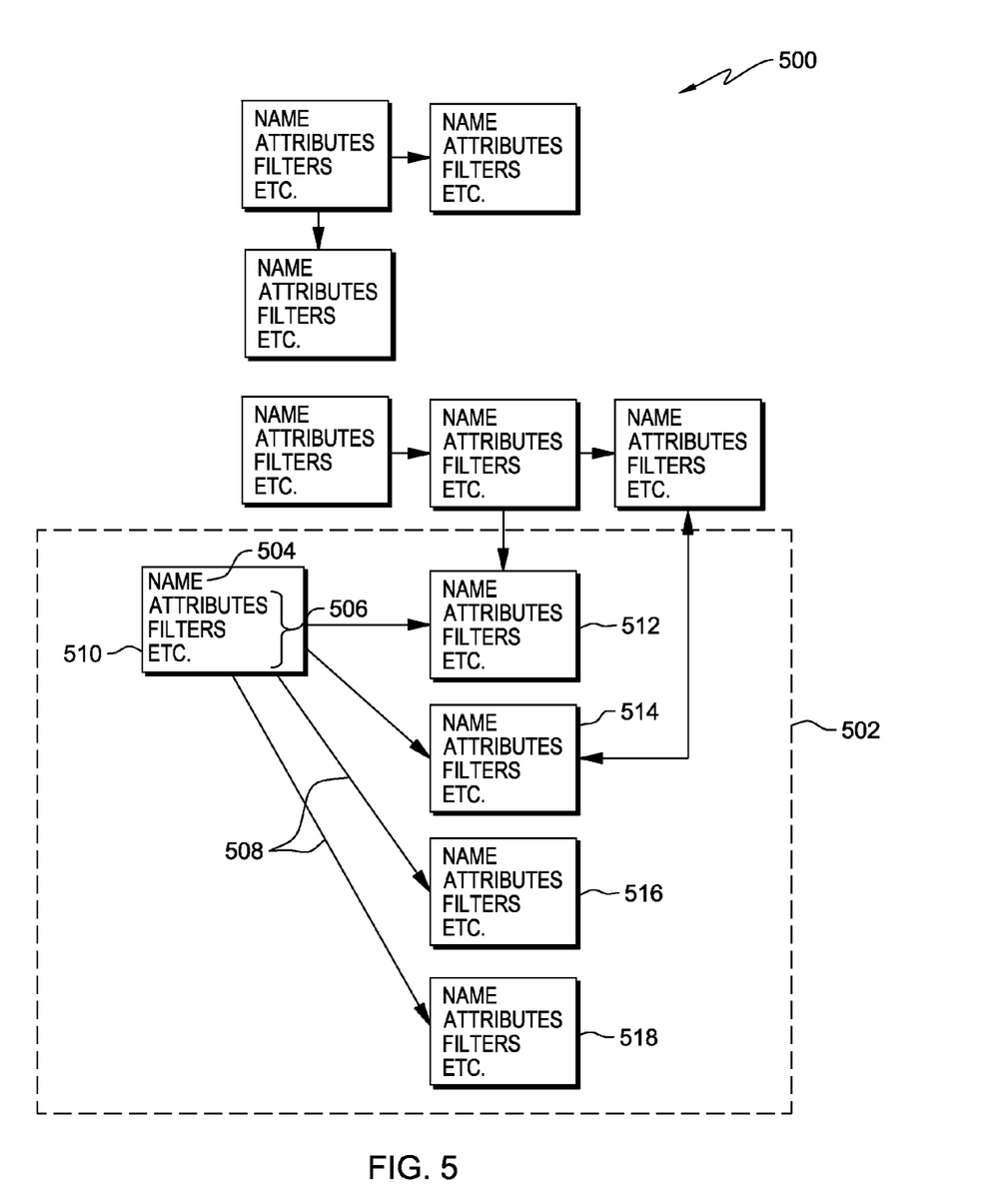
FIG. 5 depicts an exemplary reporting model as created by embodiments of the present invention.

FIG. 5 depicts reporting model 500 as created by reporting model discovery program 102, in accordance with an illustrative embodiment. Reporting model 500 depicts a plurality of reports in a reporting environment as interconnected nodes in a graphical representation. Interface 502 is an example of user interface 112 and, as shown, depicts a portion of reporting model 500. In an embodiment where the reports in a reporting environment are numerous, the entirety of reporting model 500 may not be able to display simultaneously, or may not be conveniently viewable when displayed simultaneously. The displayed portion of reporting model 500 may be directed by a user searching for specific report attributes, by dragging an image of reporting model 500 in the desired direction, by traversing the interconnections between nodes/reports, by scrolling via a mouse or arrow keys, or by other means.

Each node representing a report preferably displays a report name 504 and one or more descriptive elements 506 of the report, which may include attributes, filters, chart types, and transformations. Where applicable, interconnections 508 are depicted between interconnecting nodes. In FIG. 5, node 510 is depicted as being interconnected (or dependent) on nodes 512, 514, 516, and 518. Additionally, dependencies need not be in a single direction. For example, node 514 depicts a two-way dependency where node 514 is dependent on a node just out of interface 502 and wherein the node just out of interface 502 is also dependent on node 514. Not every node needs to have an interconnection, and the resulting relationship between nodes lacking an interconnection or dependency can be depicted by displaying the nodes without interconnecting lines.

Figure 6:
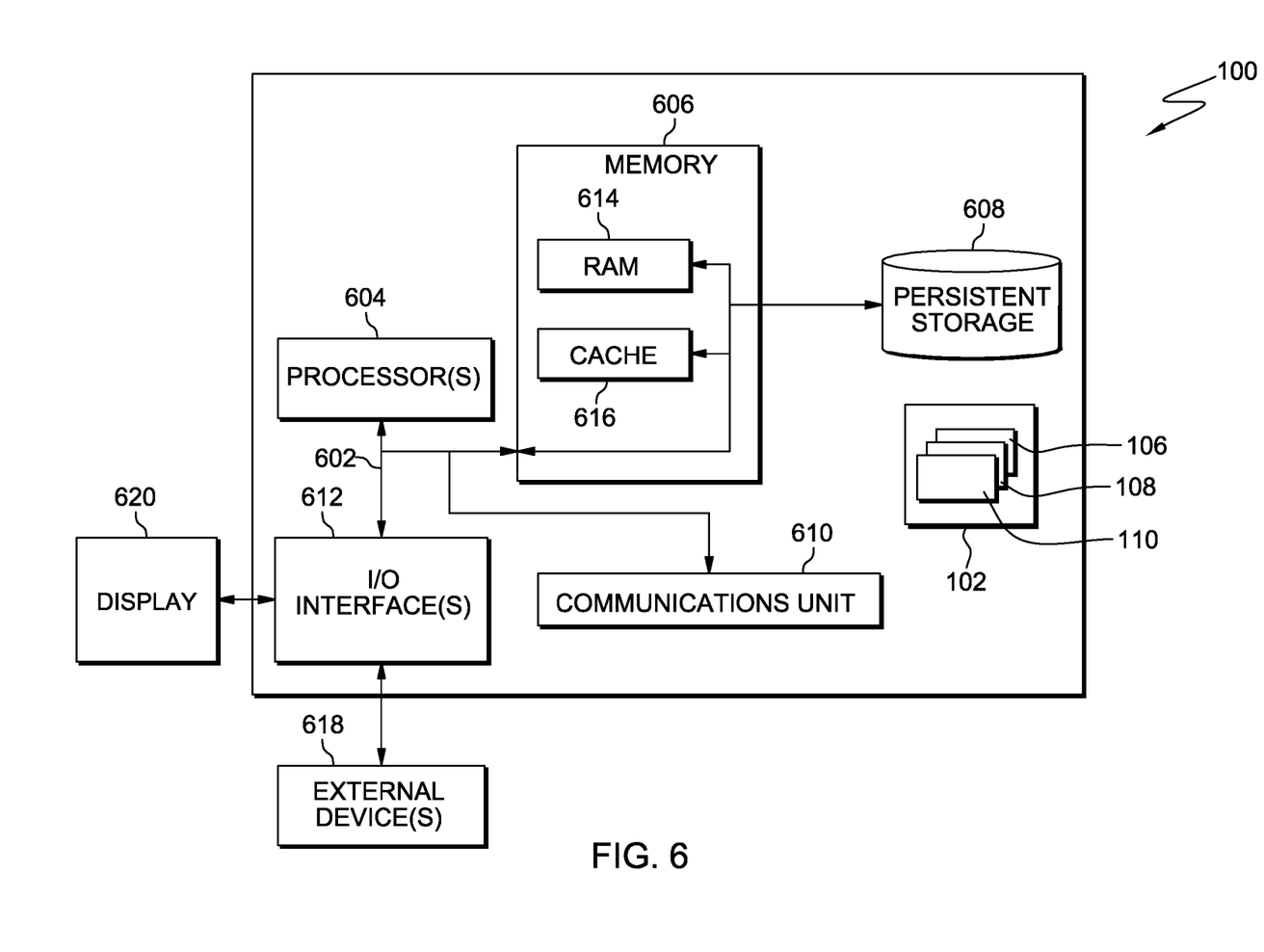
FIG. 6 depicts a block diagram of components of the data processing system of FIG. 1, in accordance with an illustrative embodiment.

FIG. 6 depicts a block diagram of components of data processing system 100 in accordance with an illustrative embodiment. It should be appreciated that FIG. 6 provides only an illustration of one implementation and does not imply any limitations with regard to the environment in which different embodiments may be implemented. Many modifications to the depicted environment may be made.

Data processing system 100 includes communications fabric 602, which provides communications between computer processor(s) 604, memory 606, persistent storage 608, communications unit 610, and input/output (I/O) interface(s) 612.

Memory 606 and persistent storage 608 are examples of computer-readable tangible storage devices. A storage device is any piece of hardware that is capable of storing information, such as, data, program code in functional form, and/or other suitable information on a temporary basis and/or permanent basis. Memory 606 may be, for example, one or more random access memories (RAM) 614, cache memory 616, or any other suitable volatile or non-volatile storage device. A computer-readable tangible storage device, as used herein, is not to be construed as being a transitory signal per se, such as radio waves or other freely propagating electromagnetic waves, electromagnetic waves propagating through a waveguide or other transmission media (e.g., light pulses passing through a fiber optic cable), or electrical signals transmitted through a wire.

Reporting model discovery program 102, metadata extraction program 106, dependency analyzer 108, and model builder 110 are stored in persistent storage 608 for execution by one or more of the respective computer processors 604 via one or more memories of memory 606. In the embodiment illustrated in FIG. 6, persistent storage 608 includes flash memory. Alternatively, or in addition to, persistent storage 608 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 608 may also be removable. For example, a removable hard drive may be used for persistent storage 608. Other examples include an optical or magnetic disk that is inserted into a drive for transfer onto another storage device that is also a part of persistent storage 608, or other removable storage devices such as a thumb drive or smart card.

Communications unit 610, in these examples, provides for communications with other data processing systems or devices. In these examples, communications unit 610 includes one or more network interface cards. Communications unit 610 may provide communications through the use of either or both physical and wireless communications links. In another embodiment still, data processing system 100 may be devoid of communications unit 610. Reporting model discovery program 102, metadata extraction program 106, dependency analyzer 108, and model builder 110 may be downloaded to persistent storage 608 through communications unit 610.

I/O interface(s) 612 allows for input and output of data with other devices that may be connected to data processing system 100. For example, I/O interface 612 may provide a connection to external devices 618 such as a keyboard, keypad, a touch screen, and/or some other suitable input device. I/O interface(s) may also connect to a display 620.

Display 620 provides a mechanism to display data to a user and may be, for example, a computer monitor.

The aforementioned programs can be written in various programming languages (such as Java® or C++) including low-level, high-level, object-oriented or non object-oriented languages. Alternatively, the functions of the aforementioned programs can be implemented in whole or in part by computer circuits and other hardware (not shown). In general, the routines executed to implement the embodiments of the present invention, may be part of an operating system or a specific application, component, program, module, object, or sequence of instructions. The programs of the present invention typically are comprised of a multitude of instructions that will be translated by the native computer into a machine-readable format and hence executable instructions. The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 7:
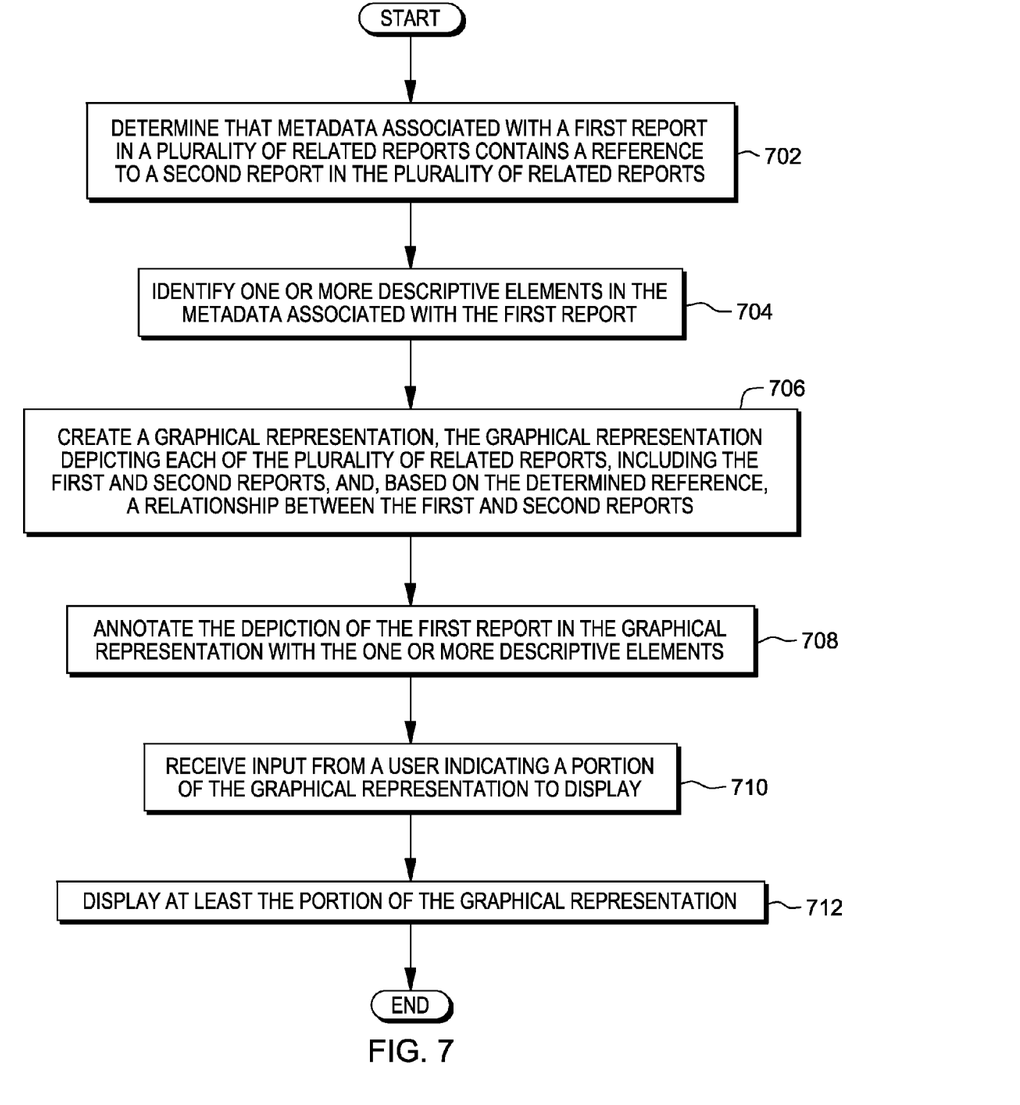
FIG. 7 illustrates a computer-implemented method, as achieved by operation the exemplary programs depicted in FIGS. 2, 3, and 4, for representing a plurality of related reports.

Further, the aforementioned programs allow data processing system 100 (or any other computer comprising similar components) to implement a method for representing a plurality of related reports (e.g., a reporting environment). FIG. 7 depicts this method.

The method depicted in FIG. 7 determines, by operation of one or more computer processors (e.g., computer processors 604), that metadata associated with a first report in the plurality of related reports contains a reference to a second report in the plurality of related reports (702). In one embodiment, references to other reports may be found in the metadata.

The method may also identify, by operation of the one or more computer processors, one or more descriptive elements in the metadata associated with the first report (704). In a preferred embodiment, each of the one or more descriptive elements is one of an attribute within the first report, a chart type within the first report, a filter applied to an attribute within the first report, and a transformation applied to an attribute within the first report.

The method creates, by operation of the one or more computer processors, a graphical representation for display on a display device (e.g., display 620), the graphical representation depicts each of the plurality of related reports, including the first and second reports, and, based on the determined reference to the second report, a relationship between the first and second reports (706). In an embodiment where references to other reports were found in the metadata, the relationships between the other reports and first report, based on the references, may also be included in the graphical representation. In one embodiment, the relationship between the first and second reports comprises the first report having a dependency on the second report. The dependency may be such that the first report, when executed, always retrieves information from the second report (i.e., a static dependency) or may be such that the first report, when executed, retrieves information from any one of a group of reports within the plurality of related reports, the group of reports including the second report (i.e., a dynamic dependency).

The method annotates the depiction of the first report in the graphical representation with the one or more descriptive elements (708). For example, a list of attributes of the first report may be provided in association with the first report. In a preferred embodiment, the one or more descriptive elements annotating the report provide a summary of the content of the first report.

Subsequent to the creation of the graphical representation, the method receives, on an input device, input from a user indicating a portion of the graphical representation to display (710). The method may display, via the display device, at least the portion of the graphical representation (712). In one embodiment, a user may enter search terms and the method will display a portion of the graphical representation depicting one or more reports corresponding to the entered search terms. In another embodiment, scrolling bars may be used or the graphical representation may be traversed to display different portions of the graphical representation. In another embodiment still, the entirety of the graphical representation may be displayed in a single view.

In a preferred embodiment, the method examines each of the reports of the plurality of related reports to similarly identify descriptive elements of the examined report and dependencies of the examined report. The graphical representation preferably incorporates the descriptive elements and dependencies of each report.

Based on the foregoing, a method, computer system, and computer program product have been disclosed for discovering and representing a reporting model for a given reporting environment. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. Therefore, the present invention has been disclosed by way of example and not limitation.

What is claimed is:

1. A method comprising:
   identifying a first report in a plurality of reports;
   extracting, from the first report, a first set of dependencies;
   extracting, from the first report, a first metadata, wherein the first metadata includes, at least:
      a first set of attributes that describe the first report, and
      a first set of filters that define a relationship between the first set of dependencies and the first set of attributes;
   identifying a second report in the plurality of reports based, at least in part, on a first dependency in the first set of dependencies;
   extracting, from the second report, a second metadata, wherein the second metadata includes, at least, a second set of attributes;
   importing, to the first metadata, a subset of the second set of attributes based, at least in part, on the first dependency and the first set of filters; and
   generating a graphical representation of, at least, the first dependency, wherein:
      the first report is represented as a first node annotated with the first metadata,
      the second report is represented as a second node annotated with the second metadata, and
      the first dependency is represented as a first edge between the first node and the second node;
   wherein:
      at least identifying the first report in the plurality of reports is performed by computer software running on computer hardware.

2. The method of claim 1, wherein:
   the first dependency is a dynamic link;
   at least one of the first report or the second report is unexecuted;
   the first set of attributes includes a chart type, which is a bar graph; and
   the second set of attributes includes a chart type, which is a line graph.

3. The method of claim 1, further including:
   extracting, from the second report, a second set of dependencies;
   identifying a third report in the plurality of reports based, at least in part, on a second dependency in the second set of dependencies;
   extracting, from the third report, a third metadata, wherein the third metadata incudes, at least, a third set of attributes;
   wherein:
      the second metadata, further includes, at least a second set of filters that define a relationship between the second set of dependencies and the second set of attributes.

4. The method of claim 1, further including:
   extracting, from a third report, a third dependency, wherein the third dependency refers alternatively to any of a sub-plurality of reports in the plurality of reports.

5. The method of claim 1, further including:
   extracting, from the plurality of reports, a fourth set of dependencies;
   wherein:
      the graphical representation further includes the plurality of reports, represented as a plurality of nodes; and
      the graphical representation further includes the fourth set of dependencies, represented as a set of edges among the plurality of nodes.

6. The method of claim 5, further including:
   displaying, from the graphical representation, only the first report, the second report, and the first dependency; and
   receiving an input to display a different portion of the graphical representation.

7. The method of claim 5, wherein:
   a fourth report in the plurality of reports does not have any dependencies; and
   no report in the plurality of reports has a dependency on the fourth report.

8. A computer program product comprising:
a computer readable tangible storage device having stored thereon:
first instructions executable by a device to cause the device to identify a first report in a plurality of reports;
second instructions executable by a device to cause the device to extract, from the first report, a first set of dependencies;
third instructions executable by a device to cause the device to extract, from the first report, a first metadata, wherein the first metadata includes, at least:
a first set of attributes that describe the first report, and
a first set of filters that define a relationship between the first set of dependencies and the first set of attributes;
fourth instructions executable by a device to cause the device to identify a second report in the plurality of reports based, at least in part, on a first dependency in the first set of dependencies;
fifth instructions executable by a device to cause the device to extract, from the second report, a second metadata, wherein the second metadata includes, at least, a second set of attributes;
sixth instructions executable by a device to cause the device to import, to the first metadata, a subset of the second set of attributes based, at least in part, on the first dependency and the first set of filters; and
seventh instructions executable by a device to cause the device to generate a graphical representation of, at least, the first dependency, wherein:
the first report is represented as a first node annotated with the first metadata,
the second report is represented as a second node annotated with the second metadata, and
the first dependency is represented as a first edge between the first node and the second node.

9. The computer program product of claim 8, wherein:
the first dependency is a dynamic link;
at least one of the first report or the second report is unexecuted;
the first set of attributes includes a chart type, which is a bar graph; and
the second set of attributes includes a chart type, which is a line graph.

10. The computer program product of claim 8, further including:
eighth instructions executable by a device to cause the device to extract, from the second report, a second set of dependencies;
ninth instructions executable by a device to cause the device to identify a third report in the plurality of reports based, at least in part, on a second dependency in the second set of dependencies;
tenth instructions executable by a device to cause the device to extract, from the third report, a third metadata, wherein the third metadata incudes, at least, a third set of attributes;
wherein:
the second metadata, further includes, at least a second set of filters that define a relationship between the second set of dependencies and the second set of attributes.

11. The computer program product of claim 8, further including:
eighth instructions executable by a device to cause the device to extract, from a third report, a third dependency, wherein the third dependency refers alternatively to any of a sub-plurality of reports in the plurality of reports.

12. The computer program product of claim 8, further including:
eighth instructions executable by a device to cause the device to extract, from the plurality of reports, a fourth set of dependencies;
wherein:
the graphical representation further includes the plurality of reports, represented as a plurality of nodes; and
the graphical representation further includes the fourth set of dependencies, represented as a set of edges among the plurality of nodes.

13. The computer program product of claim 12, further including:
ninth instructions executable by a device to cause the device to display, from the graphical representation, only the first report, the second report, and the first dependency; and
receiving an input to display a different portion of the graphical representation.

14. The computer program product of claim 12, wherein:
a fourth report in the plurality of reports does not have any dependencies; and
no report in the plurality of reports has a dependency on the fourth report.

15. A computer system comprising:
a processor set; and
a computer readable tangible storage device;
wherein:
the processor set is structured, located, connected, and/or programmed to execute instructions stored on the computer readable tangible storage device; and
the instructions include:
first instructions executable by a device to cause the device to identify a first report in a plurality of reports;
second instructions executable by a device to cause the device to extract, from the first report, a first set of dependencies;
third instructions executable by a device to cause the device to extract, from the first report, a first metadata, wherein the first metadata includes, at least:
a first set of attributes that describe the first report, and
a first set of filters that define a relationship between the first set of dependencies and the first set of attributes;
fourth instructions executable by a device to cause the device to identify a second report in the plurality of reports based, at least in part, on a first dependency in the first set of dependencies;
fifth instructions executable by a device to cause the device to extract, from the second report, a second metadata, wherein the second metadata includes, at least, a second set of attributes;

sixth instructions executable by a device to cause the device to import, to the first metadata, a subset of the second set of attributes based, at least in part, on the first dependency and the first set of filters; and seventh instructions executable by a device to cause the device to generate a graphical representation of, at least, the first dependency, wherein:
- the first report is represented as a first node annotated with the first metadata,
- the second report is represented as a second node annotated with the second metadata, and
- the first dependency is represented as a first edge between the first node and the second node.

16. The computer system of claim 15, wherein:
the first dependency is a dynamic link;
at least one of the first report or the second report is unexecuted;
the first set of attributes includes a chart type, which is a bar graph; and
the second set of attributes includes a chart type, which is a line graph.

17. The computer system of claim 15, further including:
eighth instructions executable by a device to cause the device to extract, from the second report, a second set of dependencies;
ninth instructions executable by a device to cause the device to identify a third report in the plurality of reports based, at least in part, on a second dependency in the second set of dependencies;
tenth instructions executable by a device to cause the device to extract, from the third report, a third metadata, wherein the third metadata includes, at least, a third set of attributes;

wherein:
the second metadata, further includes, at least a second set of filters that define a relationship between the second set of dependencies and the second set of attributes.

18. The computer system of claim 15, further including:
eighth instructions executable by a device to cause the device to extract, from a third report, a third dependency, wherein the third dependency refers alternatively to any of a sub-plurality of reports in the plurality of reports.

19. The computer system of claim 15, further including:
eighth instructions executable by a device to cause the device to extract, from the plurality of reports, a fourth set of dependencies;
wherein:
the graphical representation further includes the plurality of reports, represented as a plurality of nodes; and
the graphical representation further includes the fourth set of dependencies, represented as a set of edges among the plurality of nodes.

20. The computer system of claim 19, further including:
ninth instructions executable by a device to cause the device to display, from the graphical representation, only the first report, the second report, and the first dependency; and
receiving an input to display a different portion of the graphical representation.

* * * * *